Dec. 4, 1962   F. J. KEIRNAN   3,067,391
VARIABLE SPECTRUM PULSE GENERATOR
Filed Feb. 25, 1959   4 Sheets-Sheet 1

FIG. 1

INVENTOR
FLOYD J. KEIRNAN
BY
ATTORNEYS

Dec. 4, 1962 F. J. KEIRNAN 3,067,391
VARIABLE SPECTRUM PULSE GENERATOR
Filed Feb. 25, 1959 4 Sheets-Sheet 2

INVENTOR
FLOYD J. KEIRNAN

FIG. 3

INVENTOR
FLOYD J. KEIRNAN

United States Patent Office 3,067,391
Patented Dec. 4, 1962

3,067,391
VARIABLE SPECTRUM PULSE GENERATOR
Floyd J. Keirnan, Rochester, N.Y., assignor, by mesne assignments, to the United States of America as represented by the Secretary of the Navy
Filed Feb. 25, 1959, Ser. No. 795,569
12 Claims. (Cl. 331—47)

This invention relates to a radio frequency pulse generating apparatus and more particularly to apparatus for generating a radio frequency pulse or burst signal having a controllable frequency spectrum.

In testing and adjustment of radar and other high frequency equipment it would be convenient to employ a signal generator emitting adjustable signals for application to the receiver, to simulate actual operation. The echo signal received normally during the actual operation of a radar receiver varies in frequency spectrum in accordance with the quality of the transmitted signal and the transmission path encountered by the transmitted signal in returning to the receiver. Frequency analysis of the received signal indicates a main band of RF energy having the same frequency as the radar transmitter's carrier frequency, plus a number of side bands of diminishing amplitude located at frequency intervals above and below the RF carrier frequency. In a good quality radar signal return, the afore-mentioned side bands are much attenuated in amplitude below the amplitude of the main band; however, a distorted or poor signal return is often composed of a main band and one or more side bands of comparable amplitude. Under such conditions the receiver's automatic frequency control and automatic gain control can lock upon a side band as easily as the main band, resulting in erratic and undependable operation. In testing the ability of the automatic frequency control in a radar set to lock upon the main band or signal in the presence of strong side bands, and in determining the relative amplitude of main band required before an automatic frequency control will find it, it is desirable to provide a signal generator capable of producing a simulated signal having relatively variable main and side bands.

It is accordingly an object of this invention to produce a pulsed RF signal having adjustable side bands.

It is another object of this invention to provide an improved variable spectrum generator for producing radio frequency pulses with adjustable side bands.

It is another object of this invention to provide a testing apparatus for generating a simulated radar return having a main band and adjustable side lobes for coupling to a radar receiver under test.

It is further an object of this invention to provide an improved variable spectrum generator for generating radio frequency pulses having a main band and side bands on either side of said main bands, wherein relative magnitude of side bands on either side of the main band can be controlled.

It is another object of this invention to provide an improved variable spectrum generator for producing radio frequency pulses having a main band and plurality of side bands, and for adjusting the relative magnitudes of different ones of said side bands in respect to said main band.

In accordance with the invention a klystron oscillator is provided with means to apply to the repeller electrode of the klystron oscillator a negative going modulation signal comprising a pulse having a sine wave of selected frequency and amplitude superimposed across the top thereof. The means for applying the modulation signal to the klystron repeller includes some source of pulses together with a sine wave signal generator or oscillator operated coincidentally with the occurrence of the pulses, and means to combine the pulses and the sine wave for application to the klystron repeller. The source of pulses generally shock excites a tuned circuit thus creating a sine wave of a frequency determined by the tuned circuit constants and this sine wave is amplified and phased correctly for combination with the afore-mentioned pulses in a mixer circuit. Adjustments are provided for the relative magnitude of the pulse and sine wave signals together with the frequency of the latter. The klystron is then modulated along a preselected portion of the klystron's characteristic curve. Means may also be provided to slope the said pulses before combination with the sine wave so that an overall sloping modulation signal may be applied to the klystron repeller. The voltages and voltage amplitudes are chosen so that a particular klystron will be operated within the limits of one of its modes of operation, the latter being generally determined by ranges of repeller voltage. As a result of the various adjustments the klystron oscillator will produce selectable frequency spectrums having selectable combinations and sizes of side bands, in order to simulate different types of received signals.

Other objects and many of the attendant advantages of this invention will be readily appreciated as the same becomes better understood by reference to the following detailed description when considered in connection with the accompanying drawings wherein.

Figure 1:
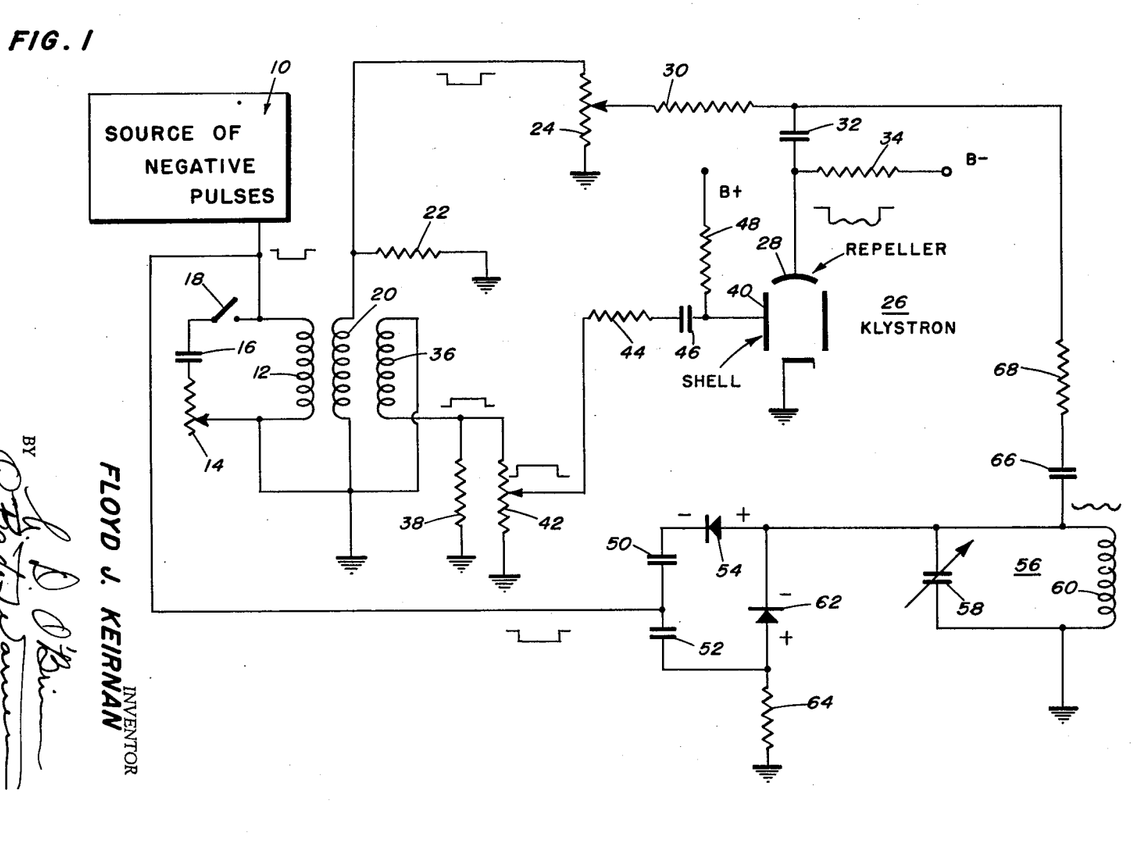
FIG. 1 is a circuit diagram of one embodiment of the invention.

Referring to FIG. 1 a source of negative pulses 10 is coupled to transformer primary 12, with said primary being shunted by an adjustable loading circuit comprising variable resistor 14, capacitor 16 and switch 18. Transformer secondary 20 shunted by loading resistor 22 provides a voltage of negative polarity, which is adjustable in amplitude by means of variable resistor 24, for coupling to the repeller electrode 28 of klystron 26 through resistor 30 and coupling capacitor 32. An appropriate source of negative voltage is also connected to the repeller electrode through load resistor 34. A second pulse transformer secondary 36 having its leads reversed for providing a positive pulse with respect to ground is shunted by loading resistor 38 and is coupled to the shell 40 of klystron 26 through adjustable resistor 42, series resistor 44, and coupling capacitor 46. The shell of the klystron is provided with an appropriate positive voltage through load resistor 48. The remaining ends of each of the pulse transformer windings, loading resistors, and adjustable resistors are returned to ground. The source of negative pulses 10 is also connected to the mid-point between capacitors 50 and 52, capacitor 50 having a relatively high capacitive reactance at the pulse frequency while capacitor 52 has a relatively low capacitive reactance at the pulse frequency. The change in voltage appearing at the mid-point between the capacitors, caused by the arrival of a negative pulse, is coupled by means of capacitor 50 through negatively poled diode 54 to tuned circuit 56 composed of variable capacitor 58 and inductance 60. The time constant of capacitor 50 is such that only a negative spike of voltage is coupled to the tuned circuit 56, shock exciting tuned circuit 56 into an initially negative going oscillation of a frequency determined by the values of capacitor 58 and inductance 60. These values are chosen such that the frequency of oscillation of the tuned circuit is equal to the frequency spacing between the main band which the klystron is to produce, and one of the side bands which is to be controlled. While the negative pulse was being conveyed to the tuned circuit via capacitor 50 and diode 54, the same pulse was also coupled to the positive side of diode 62, also connected to the tuned circuit. Since the pulse was negative, the diode 62 did not conduct until the conclusion of the negtaive pulse at which time diode 62 clamps the tuned circuit 56 back to ground level through low resistance 64, thus concluding the oscillation of tuned circuit 56. The oscillations produced by the tuned circuit are coupled via capacitor 66 and resistor 68 and through coupling capacitor 32 to the repeller of the klystron. Resistors 68 and 30 comprise a summing circuit for summing the negative going pulse obtained from winding 20 of the pulse transformer and the oscillation produced by tuned circuit 56 for a simultaneous application to repeller electrode 28. It is seen that application of a negative pulse to winding 12 of the pulse transformer produces a negative going pulse at the repeller electrode 28 with a sine wave of oscillation superimposed thereon, together with a positive pulse upon the shell of the klystron. The klystron will oscillate for the duration of the pulse at a frequency or frequencies determined by the repeller characteristic, providing voltages are applied to the repeller within its operating range. The positive and negative outputs of the pulse transformer supplied to the shell and repeller of the klystron respectively may be adjusted by means of variable resistors 42 and 24.

Figures 2, 5:
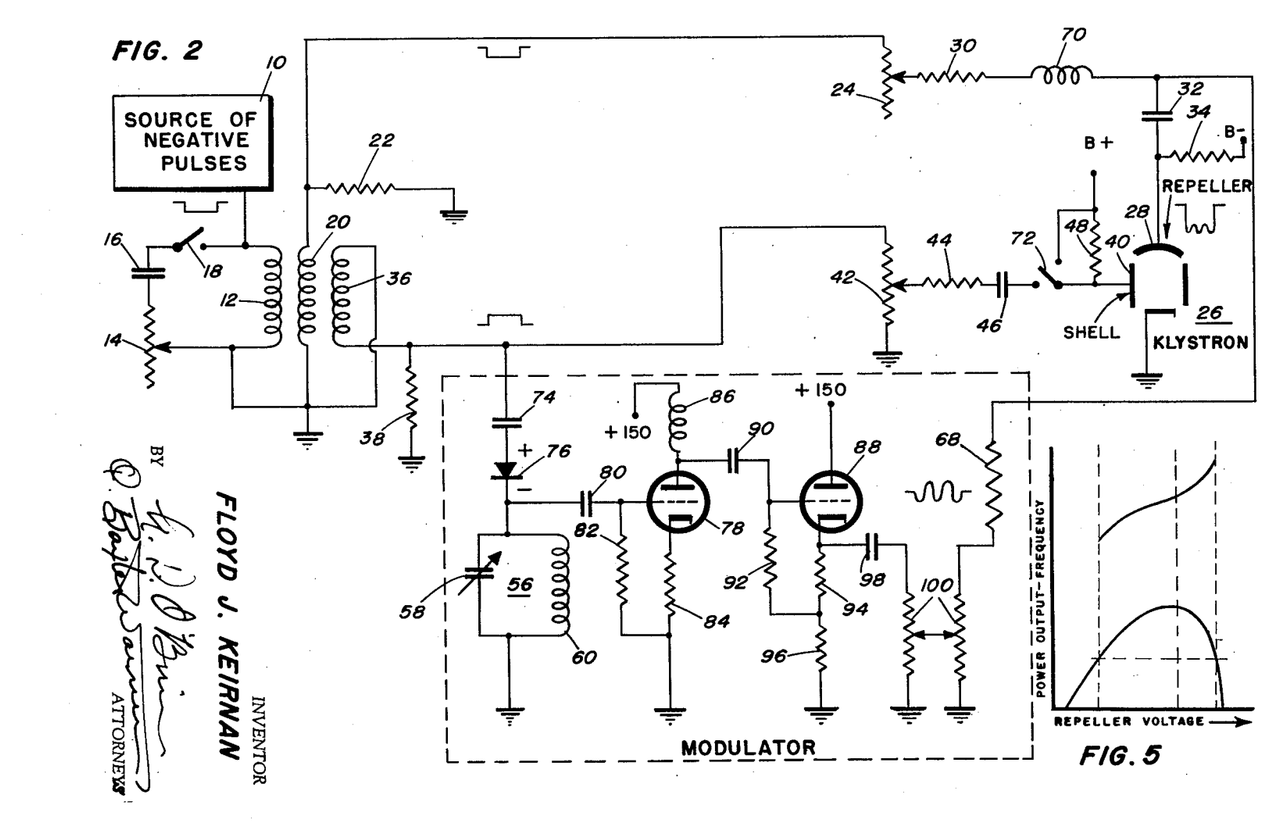
FIG. 2 is a circuit diagram of a second embodiment of the invention.
FIG. 5 is a graph of a typical klystron mode of operation.

FIG. 2 represents the second embodiment of the invention wherein a source of negative pulses 10 drives the primary 12 of a pulse transformer shunted by means of variable resistor 14, capacitor 16, and switch 18. Secondary winding 20 shunted by loading resistor 22 couples a negative pulse output of the transformer through variable resistance 24, resistor 30, choke 70, and coupling capacitor 32 to the repeller 28 of klystron tube 26. A positive going pulse output is obtained from winding 36 of the pulse transformer shunted by loading resistor 38 and coupled through variable resistance 42, resistor 44, capacitor 46, and switch 72 to the shell of the klystron, when the switch 72 is in the lower position. It is not altogether necessary that the shell of a klystron be thus pulsed simultaneously with the repeller, so alternatively the switch 72 may be in the upper position connecting directly to B+, shunting load resistor 48. The positive going pulse signal from secondary 36 of the pulse transformer is also coupled to the modulator section shown in dotted lines in the figure through capacitor 74 and positively poled diode 76, to a tuned circuit 56 composed of variable capacitor 58 in parallel with inductance 60, both returned to ground. The input for amplifier tube 78 is derived across tuned circuit 56 through input coupling capacitor 80, shunted by input resistance 82 to ground. Cathode feedback resistor 84 connects the cathode of tube 78 to ground. A positive 150 volts is supplied to the plate of tube 78 through RF choke 86. The plate of tube 78 drives the grid of tube 88 through coupling capacitor 90, and the grid of tube 88 is connected through input resistor 92 to the mid-point between resistors 94 and 96, the latter resistors in series connecting the cathode of tube 88 to ground. The arrangement is such that cathode feedback is provided by resistor 94. Tube 88 is employed in the output stage of the modulator circuit, operating as a cathode follower driving coupling capacitor 98, variable resistances 100, and resistance 68 connected in series to coupling capacitor 32 which couples to the repeller of the klystron 26. Resistors 68 and 30 act as a summing network to combine the negative pulse signal from pulse transformer winding 20 with a sine wave generated by positively pulsed tuned circuit 56 and amplified through modulator tubes 78 and 88. Tube 88 is employed as cathode follower in order to match the impedance of the summing circuit. In the device constructed, tubes 78 and 88 were two halves of a type 12AT7 tube. Radio frequency choke 70 is included in the summing circuit in order to prevent possible feedback from the output of the modulator to the input of the modulator, via the summing circuit and pulse transformer windings 20 and 36.

In the circuit of FIG. 2, as in the previous embodiment, the source of negative pulses is coupled through pulse transformer windings 12 and 20 to the repeller of the klystron, said pulses being adjustable in amplitude by means of variable resistance 24. The negative repeller is supplied through load resistor 34 and the amplitude of the negative pulses is again predetermined such that operation of the klystron oscillator takes place across one of the modes of operation as illustrated in FIG. 5, ordinarily its principal or highest amplitude mode. Positive pulses obtained through reverse connected winding 36 of the pulse transformer shock excite tuned circuit 56 whose capacitance 58 and inductance 60 are chosen such that the resonant frequency of the circuit is equal to the difference between the carrier frequency of the klystron oscillator and one of the side bands it is desired to accentuate. The sine wave generated by tuned circuit 56 and then amplified by modulator tubes 78 and 88, is coupled to repeller electrode 28 of the klystron simultaneously with the negative operating pulse derived from pulse transformer winding 20. The amplitude of the sine wave modulation is adjusted by means of variable resistance 100 and its frequency is adjusted with variable capacitor 58. The amplitude of the modulating signal will ordinarily be maintained within such limits that the klystron repeller voltage does not exceed its operating range within an operating mode as illustrated in FIG. 5.

Figure 3:
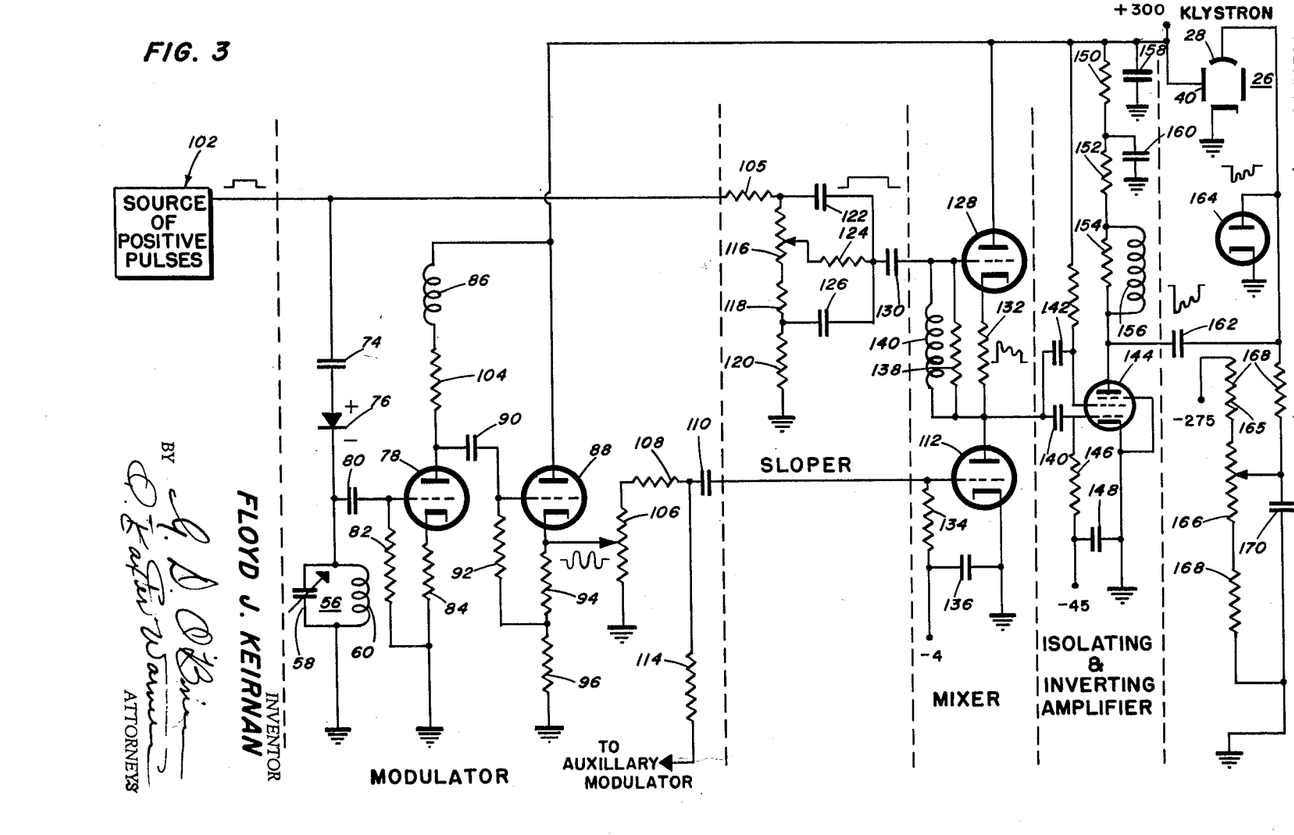
FIG. 3 is a circuit diagram of a third embodiment of the invention.

Referring to FIG. 3 there is shown another embodiment of the present invention. A source of positive pulses 102 drives a sloper circuit through resistor 105 and shock excites tuned circuit 56 via coupling capacitor 74 and positively poled diode 76. Tuned circuit 56, tuned to the frequency difference between the klystron oscillations and the side band it is desired to accentuate, is composed of inductance 60 and variable capacitor 58, employed for varying the frequency to which the circuit is tuned. Tube 78 of the modulator derives its grid input signal from across tuned circuit 56 by way of coupling capacitor 80. The grid is returned to ground through resistor 82. A cathode feedback resistor 84 connects the cathode of tube 78 to ground. The plate of tube 78 is connected to a source of 300 volts positive potential through load resistor 104 and RF choke 86, and this plate drives the grid of the following tube, 88, through coupling capacitor 90. Grid resistor 92 of tube 88 is returned to the mid-point between resistors 94 and 96 which, in series, connect the cathode of tube 88 to ground. Resistor 94 is the feedback portion of the voltage divider. Tube 88 of the modulator drives tube 112 of the following mixer through variable resistor 106, resistor 108, and coupling capacitor 110. Cathode output coupling is shown from tube 88, but the circuit may be converted to employ plate coupling by means of adaptations readily apparent to those skilled in the art.

A second modulator, whose tuned circuit may be resonant at the frequency difference of a second side band which it is desired to control, can be excited by means of the same source of positive pulses 102 and have its output coupled to the junction between resistor 108 and capacitor 110 through resistor 114. Resistors 114 and 108 would constitute a summing circuit. Such an auxiliary modulator would be similar in every respect to the one just described and illustrated in FIG. 3 with the exception of the frequency to which its tuned circuit 56 is resonant. By means of a plurality of similar modulators, a plurality of side band pairs in the final output of the klystron oscillator may be controlled in amplitude. Independent control of each set of side bands is achieved through adjustment of variable resistance 106 of the corresponding modulator.

The sloper circuit of FIG. 3, also connected to the source of positive pulses 102, includes a voltage divider composed of resistor 105, potentiometer 116, resistor 118, and resistor 120 in series to ground. A differentiating capacitor 122 which is connected to the junction between resistor 104 and potentiometer 116, a resistor 124 which is connected to the variable arm of potentiometer 116, and an integrating capacitor 126 connected to the junction between resistances 118 and 120, have their remaining leads tied together for driving mixer tube 128 through coupling capacitor 130. From the variable arm of potentiometer 116, a pulse equal in length to that supplied by source 102, but of variable slope and shape is coupled to the grid of mixer tube 128. The D.C. pedestal of the pulse thus produced is coupled on through the variable arm of potentiometer 116, resistor 124, and capacitor 130, the latter having a relatively large capacity. Capacitor 122 of a relatively smaller capacity has a differentiating effect in this coupling circuit for providing an initial higher voltage surge to tube 128 at the beginning of the pulse. On the other hand, capacitor 126 has a relative integrating effect on the pulse delivered to capacitor 130, and tends to flatten out the exponential drop on the top of the pulse waveform. A combination waveform is achieved through the adjustment of the variable arm of potentiometer 116. As the variable arm of potentiometer 116 is moved upwards towards resistor 104, a more flat-topped pulse, similar to that supplied by source 102, will be delivered to the mixer, since differentiating capacitor 122 will be more nearly shunted by low resistance 124. Likewise, as the variable arm of potentiometer 116 is moved in a downward direction, a more downwardly slanting or differentiated pulse will be produced.

The mixer including tubes 128 and 112, having the cathode of the former connected to the plate of the latter through resistance 132 receives the sloped positive pulse on the grid of tube 128, and receives the A.C. oscillations produced by the modulator on the grid of tube 112. A −4 volt source of bias voltage is applied to the grid of tube 112 through grid resistor 134 and is bypassed to ground by means of capacitor 136. The cathode of tube 112 is grounded. The grid resistor 138 of tube 128 is connected to the plate of tube 112 and is shunted with RF choke 140, the latter acting as a rejection filter for the modulation frequency but providing a low impedance at zero frequency, thereby tending to hold the D.C. level of the output pulse constant. The output of the mixer is taken at the plate of tube 112 where not only will the modulation frequency be present but also the sloped pulse, since tube 112 is included in the cathode circuit of tube 128 having a sloped pulse provided thereto. The output of the mixer drives both the control grid of video amplifier tube 144, through coupling capacitor 140, and the screen grid, through capacitor 142.

Video amplifier tube 144 serves to provide isolation and inversion as well as amplification of the signal developed in the mixer. A source of −45 volts bias voltage is provided to the grid of tube 144 through grid resistor 146, the grid being bypassed to ground through capacitor 148. The cathode of tube 144 is grounded and its plate is connected to a source of positive 300 volts through series resistances 150, 152 and 154, the latter shunted by peaking coil 156. The source of 300 volts positive is bypassed to ground through capacitor 158 and the juncture of resistors 150 and 152 is grounded through compensating capacitor 160. The output of the isolating and inverting amplifier is coupled to the repeller 28 of klystron 26 through coupling capacitor 162, the connection from the capacitor to the repeller being shunted by positively poled clipping diode 164, provided to prevent positive excursions of the repeller voltage. A source of −275 volts, connected across resistor 165, potentiometer 166, and resistor 168 in series to ground, provides a variable source of klystron repeller voltage at the movable arm of potentiometer 166. The movable arm is connected in series with resistor 168 to repeller 28 and is bypassed to ground by means of capacitor 170. The movable arm of potentiometer 166 is grounded through filter capacitor 170.

It is seen that a positive pulse, which may be sloped if desired, is combined with a sine wave having a frequency determined by tuned circuit 56, in a mixer circuit comprising tubes 112 and 128. The combined signal derived at the plate of tube 112 consists of a positive going pulse having an oscillation superimposed thereon, which may be controlled in amplitude by means of variable resistance 106. The overall slope of the signal is adjusted with potentiometer 116. The signal becomes a negative going pulse with the said oscillation superimposed thereon after passing through the isolating and inverting amplifier. This signal is then applied to the repeller 28 of klystron tube 26. The amplitude of the source of positive pulses employed, together with the amplitude of the oscillations controlled by variable resistance 106, the slope of the pulse controlled by potentiometer 116, and the negative D.C. voltage at the repeller of the klystron adjusted by potentiometer 166, are all chosen so that klystron operation will take place within an operating mode of the klystron as illustrated in FIG. 5 when the combination pulse is applied thereto. The amplitude range involved is adjusted by the various controls so that the oscillations will never take the klystron out of its operation mode, and preferably the voltages and amplitudes are adjusted so that operation takes place across the substantially flat top of the klystron's principal or power mode of operation. The amplitude of the positive pulses provided by source 102 is sufficient so that in the absence of these pulses, the voltage supplied by movable arm of potentiometer 166 will keep the klystron outside of any mode of operation, in order that oscillation takes place only during the pulses. When the tuned circuit 56 is adjusted by means of capacitor 58 to a frequency equal to the difference in frequency between the carrier frequency of the klystron oscillator and one of the side bands of the signal produced, the said side band is accentuated to a degree controlled by the amplitude of the oscillation which is in turn adjusted by means of variable resistance 106. Sloping of the positive pulse as controlled by means of potentiometer 116 controls the relative amplitude of side bands on either side of the carrier frequency and spaced equidistant therefrom. In the apparatus constructed, tubes 78 and 88 were two halves of a 12AU7, and tubes 112 and 128 were two halves of a 6BQ7. A type 6AV5 tube was employed for isolating and inverting amplifier 144, and a type 5647 was used for diode 164.

Figure 4:
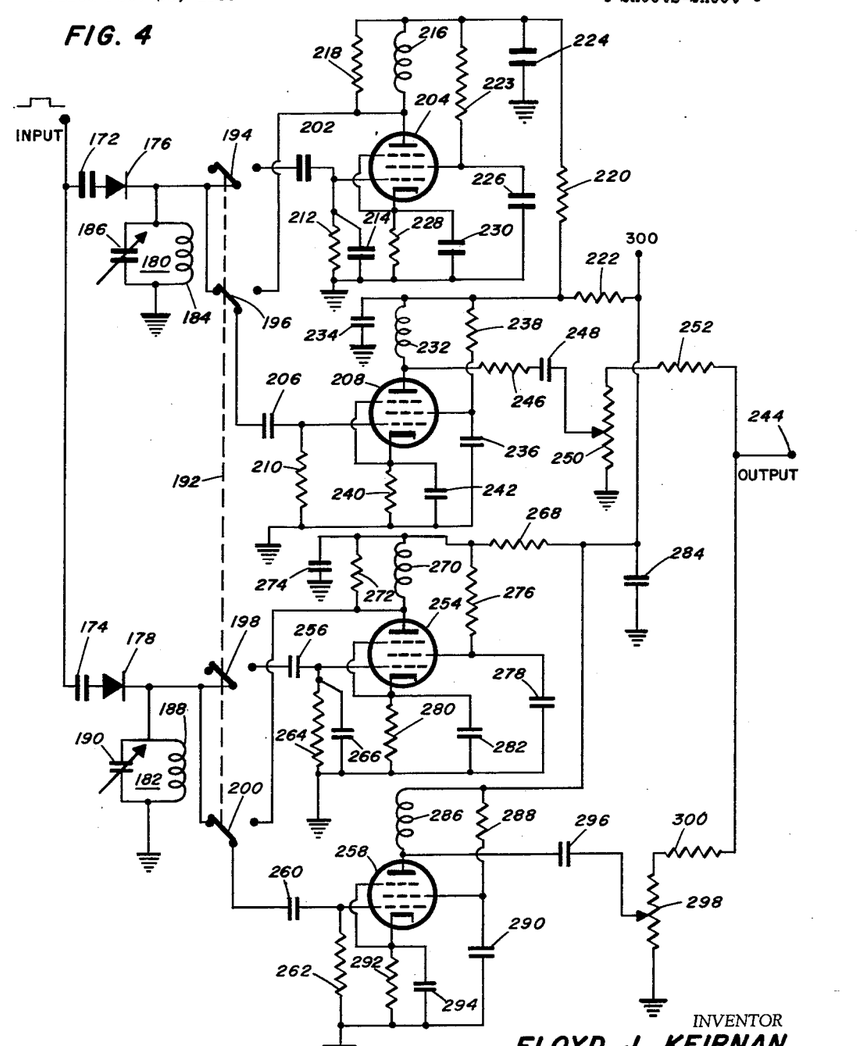
FIG. 4 is a circuit diagram of a modulator which may be alternatively employed with the embodiments of FIGS. 2 and 3.

Referring to FIG. 4 there is shown an alternative form of modulator which may be substituted, with appropriate adaptations, for the modulator of the type shown in FIGS. 2 and 3. The modulator of FIG. 4 is essentially similar to the type hereinbefore set out, but provides means for producing a modulation signal composed of a pair of sine wave oscillations of different frequencies, which are reversible in phase by 180 degrees. The positive input pulse, obtained from a source of positive pulses, is applied through input coupling capacitors 172 and 174 and through positively poled diodes 176 and 178 respectively to tuned circuits 180 and 182, thus shock exciting tuned circuits 180 and 182 into oscillation. Tuned circuit 180 composed of inductance 184 and capacitance 186 may be tuned to a different frequency from tuned circuit 182 composed of components 188 and 190. The former tuned circuit may have a range from 8 to 12 megacycles and be tuned to a frequency of 10 megacycles representing the frequency spacing of a particular side band from the carrier frequency, while the latter tuned circuit may have a frequency range of 5 to 8 megacycles to include a frequency of 6 megacycles representing the frequency spacing of a different side band from the carrier frequency. Diodes 176 and 178 permit the pulsing of tuned circuits 180 and 182 respectively, with a positive spike causing positive going oscillations to occur in the circuits, but preventing the pulsing of the tuned circuits by a negative differentiated spike at the conclusion of the input pulse. Ganged single poled double throw switches 194, 196, 198, and 200, having a single control 192, are employed to change the phase of the output of the modulator by 180 degrees by means of changing the upper and lower amplifiers from one stage circuits to two stage circuits and vice versa.

Tuned circuit 180 is connected to the center arm of switch 194 the right hand contact of which is coupled through coupling capacitor 202 to the control grid of amplifier tube 204. Tuned circuit 180 is also connected to the left hand contact of switch 196, the movable arm of which is coupled through capacitor 206 to the control grid of amplifier tube 208, returned to ground through input resistor 210. The control grid of tube 204 is returned to ground through the parallel combination of input resistor 212 and capacitor 214 employed to equalize the input impedance of tube 204 with respect to tube 208. The right hand contact of switch 196 is connected to plate of tube 204 and to the shunt feed circuit comprising RF choke 216 in parallel with resistance 218. Resistance 218 is employed in the plate circuit of tube 204 to decrease the phase shift through this amplifier stage. The opposite end of the parallel circuit is connected through decoupling resistors 220 and 222 in series to a source of a positive 300 volts plate voltage. The screen grid of tube 204 derives its voltage through dropping resistor 223 connected to the junction between resistors 218 and 220 which is maintained at RF ground level by means of bypass capacitor 224. The screen of tube 204 is bypassed to ground through bypass condenser 226. A parallel combination including resistor 228 and capacitor 230 comprise cathode bias circuit for tube 204 and this combination is inserted between the cathode and ground. Tube 208 derives its plate voltage through RF choke 232 in series with decoupling resistor 222 connected to a source of positive 300 volts. The junction between the two latter components is maintained at RF ground level by means of capacitor 234. The screen grid of tube 208, bypassed to ground through capacitor 236, derives its voltage through screen dropping resistor 238 connected to the afore-mentioned junction. A parallel combination of resistor 240 and capacitor 242 inserted between the cathode of tube 208 and ground comprises the cathode bias circuit for the stage. The plate of tube 208 drives the output terminal 244 of the modulator through the series combination of dropping resistor 246, coupling capacitor 248, potentiometer 250 and summing resistor 252.

When the gang switch control 192 is thrown to the left hand position the tuned circuit 180 is coupled directly to the output amplifier stage including tube 208 but when the switch control 192 is thrown to the right hand position, the said tuned circuit is coupled to amplifier tube 204 which in turn drives tube 208 through switch 196. Thus it appears that an amplified oscillation is delivered to output terminal 244 directly through amplifier tube 208 when the gang switch control 192 is in the left hand position, but when the gang switch is in the right hand position the oscillation from tuned circuit 180 is fed to tube 204 in cascade with tube 208. Since an amplifier tube produces a 180 degree phase shift in an A.C. signal, it is seen that a negative going oscillation will be delivered to output terminal 244 when the switch control 192 is in the left hand position, but a positive going oscillation will be delivered to the output terminal when switch control 192 is in the right hand position, since positive going oscillations are produced by tuned circuit 180.

Input for tube 254 is derived from across tuned circuit 182 with the switch control 192 in the right hand position since the switch arm of switch 198 is connected across tuned circuit 182, while the right hand contact of switch 198 is coupled through capacitor 256 to the control grid of tube 254. Tube 258 derives a signal input from across tuned circuit 182 with the switch control 192 in the left hand position, since the left hand contact of switch 200 is connected across tuned circuit 182 while the switch arm of switch 200 is coupled through input capacitor 260 to the control grid of tube 258, the latter being returned to ground through input resistor 262. The grid of tube 254 is returned to ground through the parallel combination of input resistor 264 and capacitor 266, employed to equalize the input impedance of tube 254 to that of tube 258. A positive 300 volts B+ voltage is supplied to the plate of tube 254 through isolating resistor 268 in series with a parallel circuit comprising shunt feed RF choke 270 and resistor 272. Resistor 272 is employed to decrease the phase shift of this stage. The juncture of resistor 268 in the aforesaid parallel combination is returned to ground for RF through filter capacitor 274 and supplies the voltage for the screen grid of tube 254 through screen dropping resistor 276. The screen grid of tube 254 is bypassed to ground through capacitor 278. The cathode bias circuit for tube 254 comprising the parallel combination of resistor 280 and capacitor 282 joins the cathode of tube 254 and ground.

The source of 300 volts positive, coupled to RF ground through filtering capacitor 284 is connected to the plate of tube 258 through shunt feeding RF choke 286. The voltage source also supplies voltage to the screen grid of tube 258 through screen dropping resistor 288. The screen grid is bypassed to ground through capacitor 290. The cathode bias circuit for tube 258 comprises resistor 292 in parallel with capacitor 294 inserted between the cathode of tube 258 and ground. The plate of tube 258 delivers an amplified signal to the output terminal 244 through coupling capacitor 296 in series with potentiometer 298 and summing resistor 300. Resistors 300 and 252 form a summing circuit for combining signal outputs of tubes 258 and 208. When the gang switch control 192 is in the left hand position, the oscillation produced by tuned circuit 182 is amplified and supplied to the output terminal since the tuned circuit is connected to the grid of tube 258 by means of the left hand contact of switch 200. On the other hand when gang switch control 192 is thrown in the right hand position the tuned circuit 182 is coupled to the grid of tube 254 through the right hand contact of switch 198, the plate of tube 254 driving tube 258 through the right hand contact of switch 200. It is seen that for a positive going oscillation across tuned circuit 182, a negative going output will be supplied to terminal 244 with switch control 192 in a left hand position, but a positive going output will be supplied to the output terminal when the gang switch is in the right hand position. The amplifier comprising tubes 254 and 258 is identical to the amplifier comprising tubes 204 and 232.

The modulator circuit as shown in FIG. 4 may be substituted for the modulator circuit enclosed in dashed lines in FIG. 3 and with such a substitution a combination oscillation signal will be delivered to the mixer which would comprise a pair of sine waves adjustable in frequency, phase, and amplitude. The frequency of the signals may be adjusted by means of variable capacitors 186 and 190, respectively, while the amplitudes of the signals may be adjusted with potentiometers 250 and 298 respectively. It is noted that when the sine wave or sine waves produced by the modulator are combined with a pulse of very short duration, characteristic of radar signals, only a few cycles of A.C. modulation will appear across the top of the pulse. Thus the overall shape and energy contents of the combined signal will be affected by the initial phase of the modulating sine waves. Therefore the gang switch control 192 of FIG. 4 may be employed to affect the overall pulse shape by controlling the phase of the sine wave components, or may be employed to insure that both sine wave and pulse are positive going when they reach the mixer. It has been found that, with appropriate phasing of the modulation signal and sloping of the pulse, it is possible to greatly accent side bands on one side of the carrier frequency in the klystron output as compared with side bands on the other side of the carrier frequency.

In describing the operation theory of the invention it would be desirable to consider first the frequency analysis of the various signal components which are combined to form the final output. Analysis of the spectrum of a perfect pulse, illustrated for example, at page 1012 of "Reference Data for Radio Engineers," Fourth Edition, by the Federal Telephone and Radio Corporation, indicates a main band with side bands appearing at frequency spacings away from the main band of $3/2t_0$, $5/2t_0$, $7/2t_0$, and $n/2t_0$, where $n$ is an odd integer and $t_0$ is the width of the pulse. By way of example, an analysis of the spectrum of a perfect quarter microsecond pulse shows that the first side band appears at about ±6 megacycles from a carrier frequency which the pulse may modulate, with subsequent side bands appearing at 4 megacycle intervals.

Furthermore, if a sine wave is amplitude modulated with another sine wave, side band power will appear in the frequency spectrum of the modulated wave. If $F_c$ is the carrier frequency and $F_m$ is the modulating frequency, then the side band power will appear at $F_c \pm F_m$. In conceiving the present invention it was theorized that if an RF pulse were modulated at the proper frequency or frequencies, then the side bands in the RF pulse spectrum could be accentuated and controlled. The amplitude of these side bands can be controlled by varying the percentage of modulation of the proper frequency.

One way to produce an RF pulse is to apply a negative pulse to the repeller electrode of a klystron oscillator, bringing the repeller electrode into a voltage range defining a mode of operation of the klystron oscillator, as illustrated in FIG. 5. Various ranges of negative repeller voltage will allow oscillation to take place within the reflex klystron by providing a proper degree of repulsion to the bunched electron beam such that an oscillation aiding feedback is produced in the klystron's resonant cavity. Within the various ranges of repeller voltage, termed "modes of operation," the frequency of the klystron oscillation is a function of the repeller voltage, the various modes forming distinct frequency ranges. Oscillation amplitude is also a function of repeller voltage within a mode, the amplitude of oscillation increasing as the repeller voltage is increased from a voltage point defining one edge of the mode. As the repeller voltage is further increased, the amplitude of klystron oscillation increases to a maximum and then decreases to zero at a repeller voltage defining the other end of mode of operation. The relationship is shown graphically in FIG. 5.

It would appear that if a continuously oscillating klystron were to have its repeller voltage varied at a given frequency, then both amplitude and frequency modulation would result in the output signal of the oscillator. If the repeller voltage is varied substantially across the top of the mode, frequency modulation will be the primary result.

In the present invention the klystron repeller is modulated both with a pulse and with a sine wave superimposed thereon, resulting both in side bands due to the pulse modulation and side bands due to the frequency and/or amplitude modulation. According to the present invention the side bands created by the modulating sine wave are made to coincide with a desired side band created by the modulating pulse and therefore these latter side bands may be controlled in relative amplitude, depending upon the amount and polarity of side band power created by the modulating sine wave. The sine wave modulating signal in each instance is made equal in frequency to the spacing of the desired side band away from the main band in order that the side band of the sine wave modulation will fall within the desired side band of the pulse modulation.

It appears from examining a typical klystron mode that pure amplitude modulation might be rather difficult to obtain. To achieve pure amplitude modulation by means of the sine wave signal, it would be necessary to pulse the klystron on both the repeller and beam with very nearly identical pulses of opposite polarity. Frequency modulation, however, is achieved fairly easily by pulsing into the center top of the mode with a video repeller pulse which itself is amplitude modulated. It is seen that, if the repeller voltage modulation could be restricted to a flat portion on top of a klystron power mode, then pure frequency modulation of the RF pulse would result.

In frequency modulation, the side band power is distributed over an infinite number of both upper and lower side band frequencies, whose relative spectrum power is a function of the modulation index, in a manner determined by the Bessel function of corresponding order. However, for a modulation index of less than one, all side bands above the second are negligibly small, and the amplitude of the second side band is about 12 db or more below the amplitude of the first side band. From Bessel functions it can be seen that, with a modulation index of one, the first order side band would be about 6 db down from carrier. It appears that a variable amount of spectrum power could be shifted into the side bands of the RF pulse spectrum using frequency modulation with a variable modulation index.

One disadvantage in using frequency modulation is the 180 degrees phasing relationship between the upper and lower first order side bands with respect to the carrier. For amplitude modulation, the corresponding phase relationship is zero degrees. Thus, if amplitude and frequency modulation of the same frequency are both present, respective components add in the upper side band and subtract in the lower side band. This phenomenon causes an unsymmetrical spectrum.

Also, the RF pulse may be thought of as a C.W. carrier, amplitude modulated at some fundamental frequency plus harmonics. For a quarter microsecond pulse, a 6 megacycle modulation product falls about at the center of the first side band. If the carrier frequency of the RF pulse is frequency modulated at 6 megacycles, the power due to frequency modulation in the first side band will add with amplitude modulation power in the upper side band and subtract in the lower side band. As the modulation index of the frequency modulated wave is increased, the power in the lower side band will decrease to zero and then will start increasing as the power in this side band due to frequency modulation increases beyond the power due to amplitude modulation. It is also possible to obtain various combinations of frequency modulation and/or amplitude modulation by means of adjusting the slope of the video pulse with the sloper of FIG. 3, and by means of phase changing gang switch 192 included in the modulator of FIG. 4. These controls together with the various potentiometers affecting the amplitude of sine wave and pulse signal affect the portion of the klystron power mode over which operation of the klystron oscillator takes place, thus combining various degrees of amplitude and frequency modulation. It is possible by adjusting the sloping, phasing and amplitude controls, to obtain an equal degree of amplitude and frequency modulation and thereby completely eliminate a side band or side bands on one side of the carrier frequency. The resulting spectrum can be used in checking receiver AFC pull in from one side of a carrier frequency. Because of the peculiar shape of the klystron operation mode, the sloping of the video pulse by means of the sloper in FIG. 3 is desirable in order to conversely achieve balanced side bands on each side of the carrier frequency.

The embodiments of FIGS. 1 and 2 provide means for altering or purifying the repeller modulation by providing voltage adjusting potentiometers 42 to couple a positive pulse to the shell of the klystron simultaneously with the negative pulse coupled to the repeller of the klystron. Such positive pulse may be disconnected in FIG. 2 with a switch 72 which alternatively connects the shell of the klystron directly to the appropriate B+ voltage. The source of positive pulses for the shell of the klystron is unnecessary where, as in the embodiment of FIG. 3, the klystron is pulsed into this mode of operation by means of the repeller pulse alone which is adjusted in shape by means of the sloper and a sine wave amplitude adjustment potentiometer 106, or alternatively including the modulator of FIG. 4 wherein the phase of sine wave modulation may be changed. The embodiment of FIG. 3 wherein the sine wave modulation and the video repeller pulse are combined electronically before being applied to the klystron is preferred over the embodiments of FIGS. 1 and 2, among other reasons because of the increased accuracy of control of the modulating pulse. Furthermore, additional amplification for the repeller pulse and sine wave are provided.

With the modulator of FIG. 4 a pair of side bands varying in frequency from the main carrier frequency of the klystron oscillator may be accentuated. When this modulator is used in conjunction with circuitry of FIG. 3 replacing the modulator of that figure, a pair of side bands differing in frequency may be accentuated on one side alone of the carrier frequency, or by making proper adjustments with the sloper and other controls, said pair of side bands may be made to appear on each side of the carrier frequency in the mirror image, or to any degree of amplitude desired. It is apparent that any number of modulation circuits, with tanks, for example, tuned to various side band spacings, may be employed to insert side band power into a multiplicity of RF pulse signal side bands.

In use, an object of the variable spectrum generator according to the present invention is to determine how poor a spectrum a particular receiver's automatic frequency control will lock on. For example, a receiver AFC system may be required to pull in and lock on the main carrier frequency of a radar return from 20 megacycles off tune in the presence of side bands only 4 db below the main carrier frequency band. Such a side band arrangement would be representative of a poor radar return. In testing a particular receiver, a general analysis may be made by treating the receiver automatic frequency control system as a servo mechanism. The AFC loop is disconnected and the AFC voltage is measured through a range of off tune frequencies. To substantiate data thus obtained the AFC loop may be closed and the receiver tested for pull in. The receiver should pull in to the carrier frequency despite the presence of reasonably high amplitude side bands. In a typical case the receiver pulled in from 20 megacycles off tune to a high amplitude side band, hesitated for an instant, and then pulled into the main band. It can be readily appreciated that it would otherwise be rather difficult to define the exact spectrum limits within which a receiver automatic frequency system will operate, in the absence of equipment of the type according to the present invention. The present apparatus allows the testing of RF pulse receivers in the presence of commonly encountered distorted pulse signals. The latter may be generated at will by means of the present invention. In adjusting the apparatus to produce a particular desired signal configuration, a monitoring cathode ray oscilloscope may be employed, to view the signal produced.

Obviously many modifications and variations of the present invention are possible in the light of the above teachings. It is therefore to be understood that within the scope of the appended claims the invention may be practiced otherwise than as specifically described.

What is claimed is:

1. A variable spectrum generator comprising, a klystron oscillator means for generating a high frequency signal, pulse means for modulating said high frequency signal with a second signal represented by a main band and one or more side bands spaced therefrom in frequency, means for modulating said high frequency signal with a continuous wave during the modulation by said second signal, said pulse means operating on said modulating means, said continuous wave having a frequency equal to the frequency spacing between said main band and one of said side bands, whereby a modulated signal is produced with a side band accentuated in comparison to said second signal.

2. A variable spectrum generator comprising a reflex klystron oscillator, means for pulse modulating said oscillator with pulses having a frequency spectrum including a main band and a pair of side bands spaced equally in frequency on each side of said main band, means for concurrently modulating said oscillator with a continuous wave equal in frequency to the difference in frequency between said main band and one of said side bands, whereby said oscillator produces a pulse modulated signal including a main band and a pair of side bands, said latter pair of side bands being accentuated in comparison to said former pair of side bands.

3. A variable spectrum generator comprising, a high frequency oscillator, a source of generally rectangular pulses, said pulses having a frequency spectrum including a main band and side bands spaced in frequency therefrom, means for sloping the tops of said pulses, a source of continuous wave energy equal in frequency to the difference in frequency between said main band and one of said side bands, circuit means for mixing and and-gating said pulses and said continuous wave energy, means for modulating said high frequency oscillator with said mixture, whereby a pulse modulation product is produced having accentuated side bands.

4. A variable spectrum generator comprising a high frequency oscillator, means for pulse modulating said oscillator with pulses having a frequency spectrum including a main band and a pair of side bands spaced in frequency on either side of said main band, means for sloping the top of said pulses, means for concurrently frequency modulating said oscillator with a continuous wave adjustable in amplitude for varying the modulation index of said modulation and equal in frequency to the difference in frequency between said main band and one of said side bands, whereby a pulse modulation product is produced having side bands adjustable in amplitude with the adjustment of said continuous wave.

5. A variable spectrum generator comprising, a reflex klystron oscillator having a repeller electrode, a source of negative going pulses driving said repeller electrode to pulse modulate said klystron oscillator at the top of an operating mode, said pulses having frequency spectra including a main band and a pair of side bands spaced in frequency on either side of said main band, means for generating an interrupted continuous wave concurrently with the occurrence of said pulses, said continuous wave being equal in frequency to the difference in frequency between said main band and one of said side bands, means for adjusting the amplitude of said wave, and means for also applying said wave to said electrode for frequency modulating said klystron across the top of its operating mode, whereby a pulse modulated signal is produced having side bands adjustable by means of adjusting the amplitude of said wave.

6. A variable spectrum generator comprising, a reflex klystron oscillator having a repeller electrode, a source of negative going generally rectangular pulses driving said repeller electrode to pulse modulate said klystron oscillator at the top of an operating mode, means for sloping the tops of said pulses, said pulses having frequency spectra including a main band and side bands spaced in frequency from said main band, means for generating an interrupted continuous wave during the occurrence of said pulses, said continuous wave being equal in frequency to the difference in frequency between said main band and one of said side bands, means for adjusting the amplitude of said wave, means for also applying said wave to said electrode for frequency modulating said klystron oscillator, whereby a pulse modulated signal is produced having accented side bands.

7. A variable spectrum generator comprising a reflex klystron oscillator having a repeller electrode, a source of negative going pulses driving said repeller electrode to pulse modulate said oscillator, said pulses each having a frequency spectrum including a main band and a pair of said bands each frequency spaced from said main band, a tuned resonant circuit excited concurrently with said pulses and tuned to a frequency equal to said frequency spacing of said pair of said side bands from said main band, and circuit means coupling the output of said resonant circuit to said repeller to modulate said oscillator for producing sidebands, whereby said oscillator generates a pulse modulated signal with accentuated side bands.

8. A variable spectrum generator comprising, a reflex klystron oscillator having a repeller electrode, a source of negative going pulses driving said repeller electrode to pulse modulate said klystron oscillator at the top of an operating mode, each of said pulses having a frequency spectrum including a main band and side bands spaced in frequency from said main band, resonant circuit means shocked into oscillation concurrently with the occurrence of said pulses, said resonant circuit means having a resonant frequency equal to the difference in frequency between said main band and one of said side bands, and adjustable amplifying circuit means coupling said resonant circuit means to said repeller for adjusting the voltage excursions of the oscillations of said resonant circuit means to within the voltage limits generally across the top width of an operating mode of said klystron, whereby said klystron oscillator obtains pulse modulation and concurrently frequency modulation with a variable modulation index for adjusting the relative apparent magnitude of said one of said side bands in the modulation product.

9. A variable spectrum generator comprising, a reflex klystron oscillator having a repeller electrode, a source of negative going pulses driving said repeller electrode to pulse modulate said klystron oscillator at the top of an operating mode, each of said pulses having a frequency spectrum including a main band and side bands spaced in frequency from said main band, plural resonant circuit means shocked into oscillation concurrently with the occurrence of said pulses, each of said resonant circuit means having a resonant frequency equal to the difference in frequency between said main band and different ones of said side bands, and plural adjustable amplifying circuit means coupling each of said resonant circuit means to said repeller for restricting the voltage excursions of the oscillations of said resonant circuit means to within the voltage limits generally across the top width of an operating mode of said klystron, whereby said klystron oscillator is pulse modulated and frequency modulated with a plurality of frequencies of variable amplitude and modulation index for adjusting the relative apparent magnitude of a plurality of said side bands in the modulation product.

10. A variable spectrum generator comprising, a reflex klystron oscillator having a repeller electrode, a source of generally rectangular pulses having frequency spectra including a main band and side bands spaced in frequency from said main band, a resonant tank circuit shock excited by said source, said resonant tank circuit having a resonant frequency equal to the difference in frequency between said main band and one of said side bands, a mixing circuit having a pair of input terminals for separate signals to be mixed and a single output terminal, means coupling said source of pulses to one of said input terminals, variable amplification means coupling the output of said resonant tank circuit to the other of said input terminals, and circuit means coupling said single output terminal to said repeller electrode, whereby a pulse modulation product is produced, said modulation product having a side band variable in amplitude with said variable amplification.

11. The apparatus as recited in claim 10 having means to slope the top of said generally rectangular pulses for adjusting the relative magnitude of said bands of the same order on either side of the main band in said modulation product.

12. A variable spectrum generator comprising: a reflex klystron oscillator having a repeller electrode; a source of generally rectangular positive pulses having frequency spectra including a main band and side bands spaced in frequency from said main band; a resonant tank circuit shock excited by said source, said resonant tank circuit having a resonant frequency equal to the difference in frequency between said main band and one of said side bands; a pulse top sloping circuit for receiving said pulses, said sloping circuit including a variable resistance voltage divider with portions thereof shunted by capacitors; a mixer circuit comprising a first vacuum tube having at least an anode, a cathode, and a grid coupled to receive the output of said voltage divider, and a second vacuum tube having at least an anode, a cathode, and a grid, said mixer circuit also including a resistor connecting the cathode of said first vacuum tube to the anode of said second vacuum tube, said anode of said second tube constituting the output terminal of said mixer circuit; a two stage amplifier coupling the output of said resonant tank circuit to said grid of said second vacuum tube of said mixer; an isolating and inverting vacuum tube driven by the output of said mixer circuit and having its cathode grounded; circuit means coupling the output of said isolating and inverting amplifier to said repeller electrode, and a positively poled diode shunting said repeller electrode to ground.

References Cited in the file of this patent

UNITED STATES PATENTS 2,406,803     Chatterjea et al. _________ Sept. 3, 1946

UNITED STATES PATENT OFFICE

CERTIFICATE OF CORRECTION

Patent No. 3,067,391                          December 4, 1962

Floyd J. Keirnan

It is hereby certified that error appears in the above numbered patent requiring correction and that the said Letters Patent should read as corrected below.

Column 13, line 15, for "said", first occurrence, read -- side --.

Signed and sealed this 5th day of November 1963.

(SEAL)
Attest:

ERNEST W. SWIDER
Attesting Officer

EDWIN L. REYNOLDS
Acting Commissioner of Patents